No. 787,477.

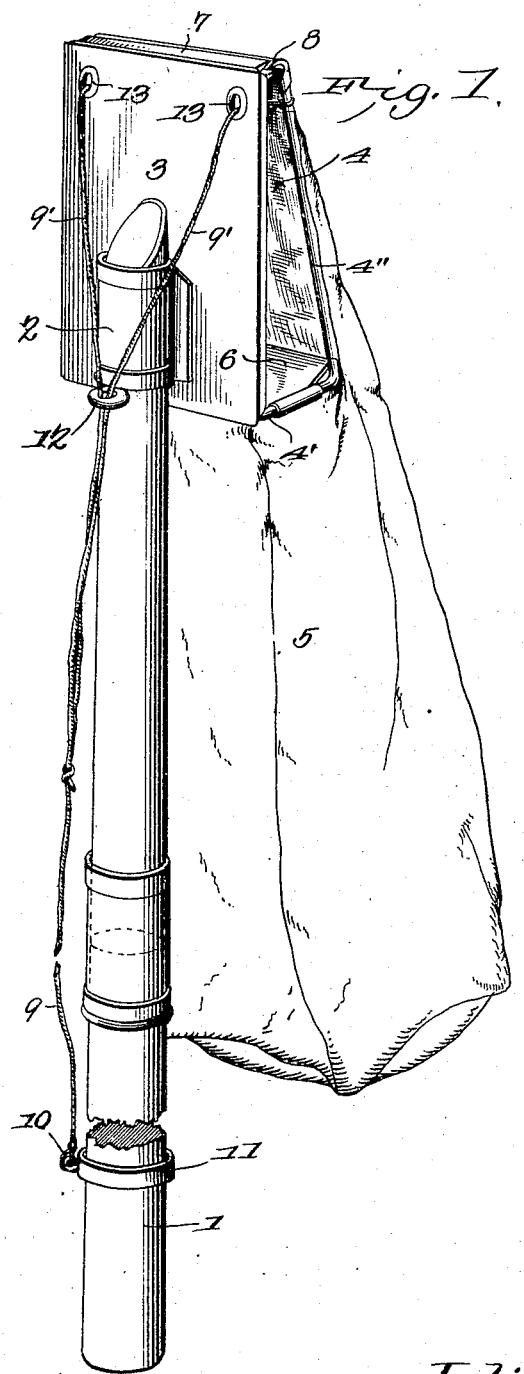
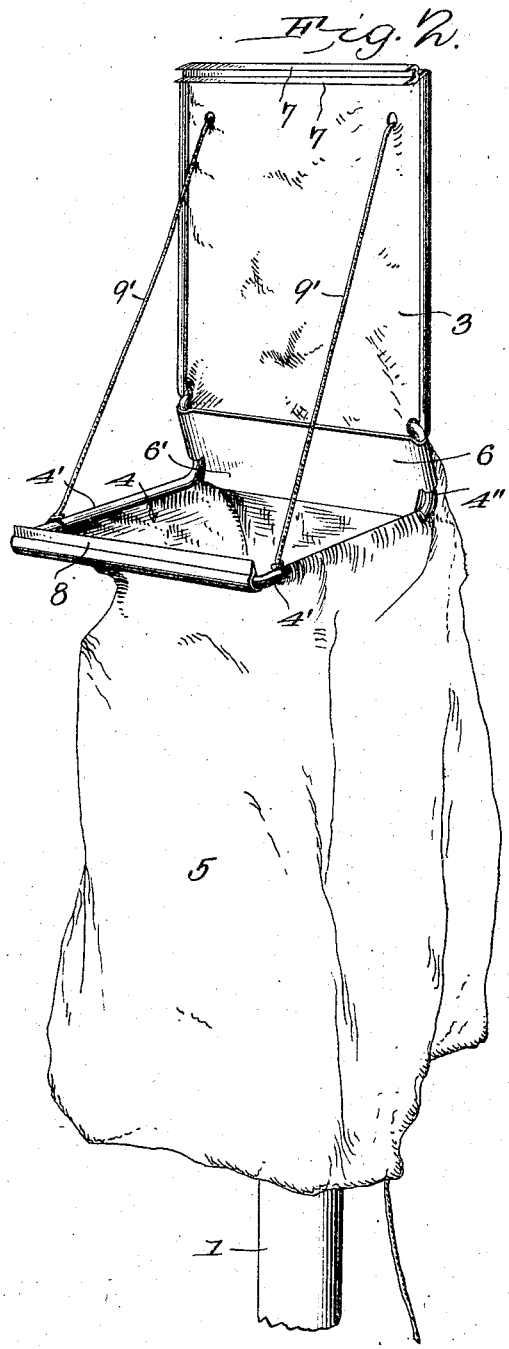

Patented April 18, 1905.

UNITED STATES PATENT OFFICE.

JULIUS G. SMITH, OF LIBERTY, NEW YORK.

FRUIT-PICKER.

SPECIFICATION forming part of Letters Patent No. 787,477, dated April 18, 1905.

Application filed May 17, 1904. Serial No. 208,461.

*To all whom it may concern:*

Be it known that I, JULIUS G. SMITH, a citizen of the United States, residing at Lake Liberty Inn, Liberty P. O., in the county of Sullivan and State of New York, have invented a new and useful Fruit-Picker, of which the following is a specification.

This invention relates to fruit-pickers of the kind which comprise a pole on which is supported a knife or cutter to sever the fruit from the tree and a bag or receptacle to receive the fruit as it falls. In such fruit-pickers a long bag is employed in order to increase the picking and holding capacity of the device, and it usually happens that the fruit is slightly bruised by falling into the bag upon the top of the fruit already contained therein.

The object of the present invention is to avoid this bruising of the fruit without decreasing the capacity of the bag or receptacle.

With this end in view the invention comprises a pair of pivoted jaws provided with cutting edges at their upper ends, a receptacle attached to the jaws, and a shelf or retarder brought into operative position by one of the jaws to stop the picked fruit halfway on its descent and so break the violence of its fall into the receptacle.

The invention also resides in the particular combination of parts and details of construction hereinafter described with reference to the accompanying drawings, forming part of this specification, wherein—

Figure 1 is a perspective view of the device with the jaws closed. Fig. 2 is a similar view with the jaws open.

The reference-numeral 1 indicates the supporting pole or handle of the improved fruit-picker, which may be made in jointed sections, if desired, to adapt it for use upon fruit trees or limbs of various heights. At its upper end the pole 1 fits into the socket 2 of the stationary jaw 3 of the fruit-picker. The stationary jaw is preferably made of metal or other suitable material and is square or rectangular in shape. Pivoted in any suitable manner to the lower edge of the stationary jaw 3 is a movable jaw 4, which preferably consists of a rectangular frame made of wire or bar-iron, the two side pieces of the frame being bent at a right angle to form an approximately horizontal portion 4' and an approximately vertical portion 4''.

The bag or fruit-receptacle 5, which is made preferably of cloth, is attached to the upper and side edges of the movable jaw 4 and has a flap covering the entire inner face of the stationary jaw 3, being attached to the edges of said stationary jaw in any suitable manner. Extending transversely between and securely attached to the horizontal portions 4' 4' of the side pieces of the movable jaw 4 is a piece 6 of cloth or other suitable material, which forms a shelf or retarder to break the fall of the fruit. It will be observed that the bag 5 has considerable fullness between the horizontal portions 4' 4' of the side pieces of the movable jaw, so as to permit the picked fruit which has been stopped in its descent by the shelf 6 to roll off the outer edge 6' of said shelf into the bag below.

Attached to the upper edge of the stationary jaw 3, preferably in such manner that they can be removed easily and resharpened, are two parallel cutting-blades 7. A similar removable cutting-blade 8 is attached to the upper edge of the movable jaw 4 in such manner that when the two jaws of the device are drawn together the blade 8 fits between the blades 7 7 and severs the stem of the fruit.

A cord 9, which is attached at its lower end to an eye 10 on a ring 11, which loosely surrounds the pole 1, serves to operate the jaws of the device. The cord 9 forks at its upper end into branches 9' 9', which pass through a guide-eye 12 on the pole 1 and through eyelet holes 13 in the stationary jaw 3, being attached to the sides of the movable jaw 4 in any suitable manner. By moving the ring 11 downward on the pole 1 the upper end of the jaw 4 is drawn against the upper end of the jaw 3 and the fruit is severed by the knives 7 and 8, the fruit then dropping onto the shelf 6 and resting thereon until the jaw 4 is permitted to fall back away from the jaw 3 into open position, when the incline which is given to the shelf 6 causes the fruit to roll off the outer edge 6' thereof into the receptacle below. It will be observed that the opening or throat of the bag or receptacle is not at the point where the jaws are pivoted together, but is entirely within the frame of the movable jaw. Furthermore, by reason of the fact that the material forming the shelf 6 is stretched between the portions 4' 4' of the movable jaw said shelf is always brought into horizontal position to break the fall of the fruit when the jaws are drawn together and is lowered into an inclined position to permit the fruit to roll into the receptacle when the jaws are permitted to fall apart.

Having thus described the invention, what is claimed is—

In a fruit-picker, a rectangular stationary jaw-plate having a socket for the reception of a handle-pole, a jaw-frame having side members bent at right angles to form approximately horizontal and approximately vertical members, said jaw-frame having hinge connection with the lower edge of the stationary jaw-plate, a fabric bag attached to the jaw-frame and having a flap attached to and forming an interior covering for the stationary jaw-plate, a strip of fabric stretched between the side members of the movable jaw-frame, cutters connected with the jaws, and means for manipulating the movable jaw.

In testimony that I claim the foregoing as my own I have hereto affixed my signature in the presence of two witnesses.

JULIUS G. SMITH.

Witnesses:
 LARY McGRATH,
 STEPHEN E. STURGIS.